(No Model.)
C. CRONIN.
APPARATUS FOR DISPENSING BEER AND MEANS FOR CLEANING SAME.
No. 596,432. Patented Dec. 28, 1897.
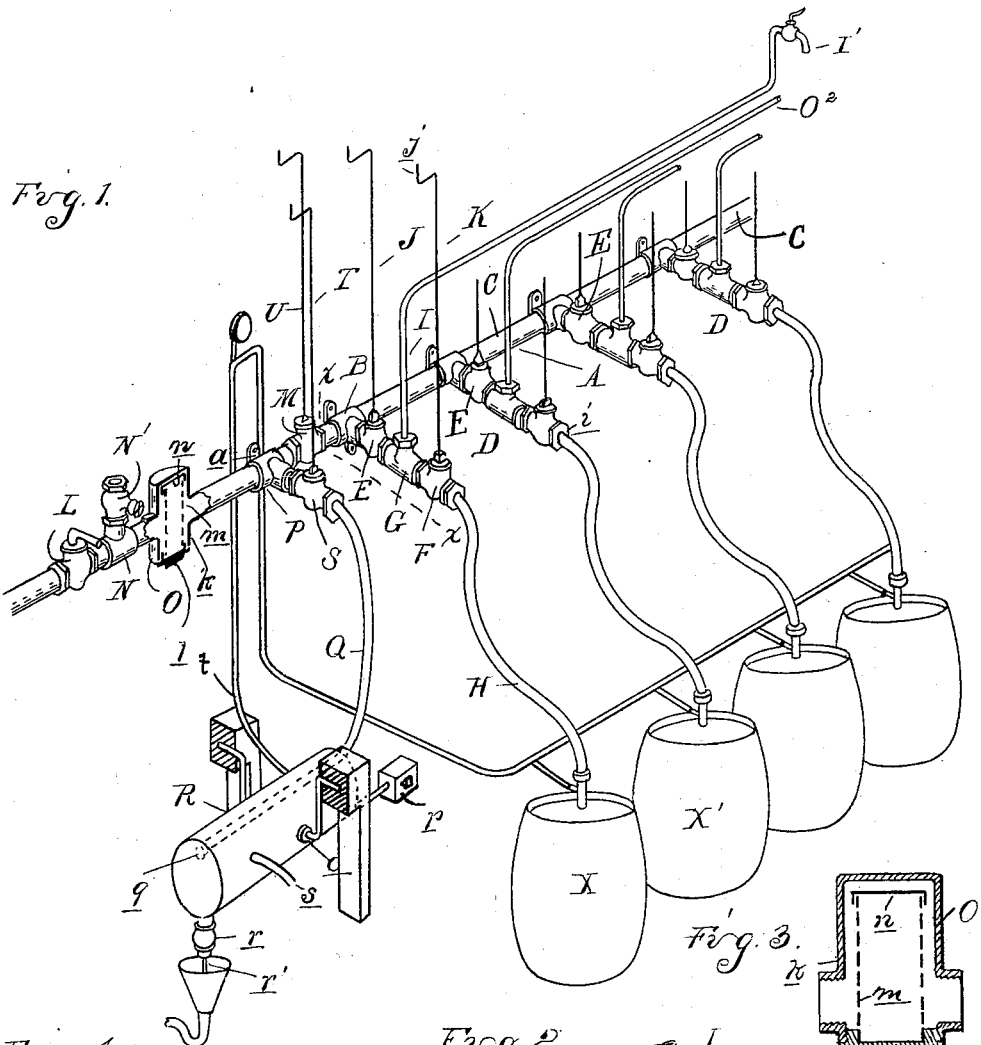
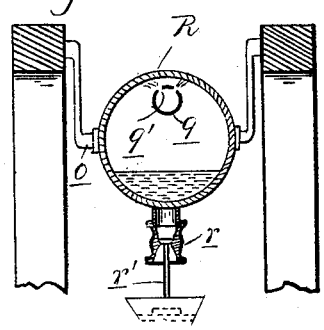
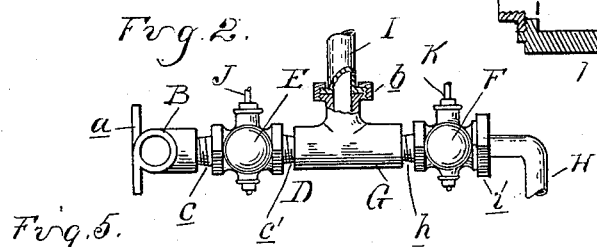
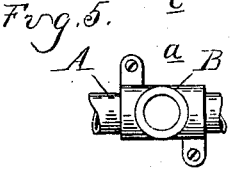
Inventor
Cornelius Cronin
By Thos. S. Sprague & Son,
Attys.
Witnesses
Otto F. Barthel
M. A. Dougherty

UNITED STATES PATENT OFFICE.

CORNELIUS CRONIN, OF DETROIT, MICHIGAN, ASSIGNOR OF TWO-THIRDS TO JOHN COSGROVE AND JAMES D. BURNS, OF SAME PLACE.

APPARATUS FOR DISPENSING BEER AND MEANS FOR CLEANING SAME.

SPECIFICATION forming part of Letters Patent No. 596,432, dated December 28, 1897.

Application filed February 8, 1897. Serial No. 622,393. (No model.)

*To all whom it may concern:*

Be it known that I, CORNELIUS CRONIN, a citizen of the United States, residing at Detroit, in the county of Wayne and State of Michigan, have invented certain new and useful Improvements in Apparatus for the Dispensing of Beer and other Beverages and Means for Cleaning the Same, of which the following is a specification, reference being had therein to the accompanying drawings.

It is the object of my invention to provide means for quickly cleaning all parts of the apparatus necessary for the distribution of beer and other beverages to bars; and it is the further object to so construct the apparatus that the beer or liquor from only one of the kegs or supply-casks may be distributed to any or all of the taps at the bar.

The invention consists in the peculiar construction, arrangement, and combination of parts, all as more fully hereinafter described and claimed.

In the drawings, Figure 1 is a perspective view of my apparatus. Fig. 2 is an elevation, partly in section, of one of the lateral connections D and its associated parts. Fig. 3 is a section of the fitting into which the cleaning compounds are introduced. Fig. 4 is a section through the air-tank. Fig. 5 is a detail of one of the T-fittings.

A is a pipe which is preferably arranged in a horizontal position and secured to the side wall of the basement or room in which the beer or other liquor is kept. This pipe comprises a number of T-fittings B, united by the nipples or short section of pipe C. The T-fittings B are preferably provided with the diagonally opposite wings or lugs $a$, which form a means of securing the pipe A to the wall.

D are lateral connections to the pipe A, each comprising the valves E and F, arranged on opposite sides of a T-fitting G, and the pipe H, leading to the cask containing the liquor. The fittings G connect the lateral pipe D to the upwardly-extending pipe I, leading to the taps at the bar, and each is preferably provided with a union-coupling $b$ for connecting it to the pipe I and with female threads at its opposite ends, with which the valves E and F connect. The valve E is preferably provided with the threaded nipples $c$ and $c'$ at opposite ends, one adapted to engage with the T-fitting B and the other with the T-fitting G. The valve F is also provided at one end with a threaded nipple $h$ for connecting it with the fitting G and at its opposite end with the union-coupling $i$, connecting it with the pipe H.

Both valves E and F are provided with stems J K, extending upwardly to the bar and having suitable cranks or operating-handles $j$ at their upper ends.

The pipe A is connected at one end to a source of supply of water under pressure, and between the connection and the first of the T-fittings B are connected into the pipe A the valves L and M, between which are arranged the T-fitting N, the chemical-chamber O, and the T-fitting P.

The fitting P connects the pipe A to a lateral pipe Q, connected to the air-tank R and controlled by the valve S, said valve being provided with an upwardly-extending stem T, similar to the stems J and K. The valve M is also provided with a similar valve-stem U.

The fitting N forms a means of connecting the pipe A with a source of hot water and is provided with a controlling-valve N'. The chemical-chamber O, as shown in Fig. 3 of the drawings, comprises the outer casing $k$, preferably of a cylindrical form, having the screw plug or cap $l$ at its lower end, to which is secured the inner perforated casing $m$.

$n$ is a cap for the upper end of the inner casing $m$.

The air-tank R is preferably a tilting tank and is supported upon the trunnions $o$, arranged a little to one side of the center of the tank, an adjustable counterweight $p$ at the short end of the tank serving to hold it normally in horizontal position.

The pipe Q connects to the pipe $q$, extending through the tank R near its top and having the perforations $q'$ on its upper side.

$r$ is a valve-controlled outlet from the bottom of the tank R, adapted to be opened upon the tilting of the tank by the striking of the valve-stem $r'$.

$s$ is the connection to the air-compressor, (not shown,) and $t$ is a pipe leading to the various casks containing the beer or liquor.

The parts being constructed as shown and described, the operation of the apparatus is as follows: The kegs containing the beer or liquor are first connected to the pipes H and to the air-pipe connections, after which the valves E are shut and the valves F are opened, these being under the control of the bartender, by means of the valve-stems J and K. When thus arranged, the beer may pass freely from each keg through the pipes H and I to the taps I', and the contents of the different kegs being kept separate different kinds of liquor may be kept in each. Should one of the kegs (such as X) become empty before the others, the bartender may, if he so desires, draw the liquor from one of the other kegs (such as X) through the tap corresponding to the empty keg. To accomplish this, he shuts off the valve F and opens the valves E and E', the valve M in the pipe A being also normally closed. This will open a passage for the liquor from the keg X' to the pipe A and from the pipe through the opened valves E to the pipe I, leading to the tap. At the same time the liquor may be drawn from the cask X' through its own tap $O^2$. Thus from a single cask liquor may be drawn through one or all of the taps. Again, where the kegs contain different kinds of liquor the bartender may draw from any one of the taps liquor from any one of the casks by operating the valves E F.

Whenever it is necessary to clean out the pipes, this may be accomplished by opening the valve E and if the casks are not empty closing the valves F. The valve M is then opened, and the valve L being normally open water will be forced into the pipe A, into all of the lateral pipes D, and through the pipes I to the taps. If the casks are empty, the valves F are also opened and the water forced through the connections H into the casks, or, if desired, the connection H may be disconnected from the cask and the water discharged into the drain. As the air-tank and pipes also become foul by the use of the apparatus these may be cleaned as often as necessary by opening the valve S, which admits water through the pipe Q into the perforated pipe q within the air-tank. From this pipe the water is discharged in upwardly-directed jets, washing down the sides of the tank and collecting in the bottom, where when there is a sufficient quantity to overbalance the counterweight p the tank will tilt, opening the valve in the discharge-pipe r by striking the stem r' against an abutment and allowing the water to run out of the tank.

If the tank is held from tilting, so that it will fill with water above the point at which the pipe t connects, the water will also be forced through said pipe and its connections to each of the casks. Thus all parts of the apparatus may be flushed with water as often as necessary, and as the valves are all controlled from the bar it is not even necessary for this purpose to enter the basement containing the apparatus. Where a more thorough cleansing is necessary, the cap n of the chemical-chamber is removed, and a suitable cleaning compound, such as caustic soda, may be placed in the perforated casing m. When the cap is replaced, the water passing through the perforated chamber dissolves the material and carries it to all parts of the apparatus. Hot water or steam may also be introduced through the T-fitting N, the valve L first being closed.

The various parts of my apparatus are designed to be inexpensive to construct and easy to assemble. Thus the T-fitting B being provided with the wings a, diagonally opposite each other, may be easily screwed to the wall, as there is nothing to prevent the use of the ordinary screw-driver, whereas if the lugs a were central of the fitting B the valve E would interfere with such use.

The nipples c c' on the valve E and the union-couplings on the T-fitting G and valve F are also an advantageous construction.

What I claim as my invention is—

1. In an apparatus for dispensing beverages, the combination of a pipe A having a valve-controlled water-supply connection, a plurality of lateral branches connected to said pipe, each branch adapted to be connected to a cask containing the beer or other liquor, a pipe connected to each branch leading to a tap, and two valves in each branch one between the tap-pipe and the cask-pipe and the other between the tap-pipe and the pipe A.

2. In an apparatus for dispensing beverages, the combination of a plurality of liquid-supply casks, an air-supply tank, connections from the air-tank to the casks, a pipe such as A having a valve-controlled water-supply, a plurality of branches connected with said pipe each adapted to be connected with a cask, a tap connected to each branch, and two valves in each branch one between the tap connection and the pipe A and the other between the tap connection and the cask.

3. The combination of the pipe A comprising the T-fittings B and the connecting pipe-sections C, the lateral connections D, each comprising the valves E and F, the T-fitting G between the valves and the pipe H, connecting with the valve F, the pipes I connected to the end of the fittings G and leading to the taps, and a valve-controlled water-supply connecting to one end of the pipe A, for the purpose described.

In testimony whereof I affix my signature in presence of two witnesses.

CORNELIUS CRONIN.

Witnesses:
M. B. O'DOGHERTY,
OTTO F. BARTHEL.